(12) United States Patent
Lin et al.

(10) Patent No.: US 8,788,969 B2
(45) Date of Patent: Jul. 22, 2014

(54) ELECTRONIC DEVICE AND METHOD FOR PRESENTING FILES

(75) Inventors: Tay-Yang Lin, New Taipei (TW);
Chin-Feng Chen, New Taipei (TW);
Shu-Ming Liu, New Taipei (TW);
Chi-Tse Shih, New Taipei (TW);
Ni-Chun Hou, New Taipei (TW);
Hsin-Chih Hsu, New Taipei (TW);
Cheng-Hsiu Du, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 229 days.

(21) Appl. No.: 13/324,760

(22) Filed: Dec. 13, 2011

(65) Prior Publication Data
US 2012/0227010 A1   Sep. 6, 2012

(30) Foreign Application Priority Data
Mar. 4, 2011   (TW) .............................. 100107469 A

(51) Int. Cl.
*G06F 13/00* (2006.01)
*G06F 15/00* (2006.01)
*G06F 3/048* (2013.01)
*G06F 3/0481* (2013.01)

(52) U.S. Cl.
CPC .............. *G06F 3/048* (2013.01); *G06F 3/0481* (2013.01)
USPC .......................................... 715/810; 715/784

(58) Field of Classification Search
CPC ................................ G06F 3/048; G06F 3/0481
USPC .................. 715/773, 810, 863, 866, 784, 786
See application file for complete search history.

(56) References Cited

U.S. PATENT DOCUMENTS

| | | | | |
|---|---|---|---|---|
| 2008/0174570 A1* | 7/2008 | Jobs et al. | ...................... | 345/173 |
| 2010/0007623 A1 | 1/2010 | Kaneko et al. | | |
| 2011/0258581 A1* | 10/2011 | Hu | ................................ | 715/811 |

FOREIGN PATENT DOCUMENTS

| | | |
|---|---|---|
| EP | 2076000 A2 | 7/2009 |
| EP | 2278447 A1 | 1/2011 |

\* cited by examiner

*Primary Examiner* — Cao (Kevin) Nguyen
(74) *Attorney, Agent, or Firm* — Novak Druce Connolly Bove + Quigg LLP

(57) ABSTRACT

An electronic device includes a touch-sensitive display; a storing module, an accessing module, a display controller, a sensing module, and a file operating module. The accessing module obtains a folder representative icon from the storage module. The display controller displays the folder representative icon on the touch-sensitive display. The sensing module detects a first slide operation along a first direction on the folder representative icon. The file operating module spreads out a first display window, along the first direction from a side of the folder representative icon to display the sub-folder representative icon. The sensing module further detects a second slide operation on the sub-folder representative icon. The file operating module further spreads out the second display window, along a second direction substantially perpendicular to the first direction, from a side of the sub-folder representative icon.

16 Claims, 6 Drawing Sheets

ELECTRONIC DEVICE AND METHOD FOR PRESENTING FILES

CROSS-REFERENCE TO RELATED APPLICATIONS

This application is related to co-pending U.S. patent application entitled "ELECTRONIC DEVICE AND METHOD FOR PRESENTING FILES", 13/325704.

BACKGROUND

1. Technical Field

The present disclosure relates to an electronic device and a method for presenting files.

2. Description of Related Art

Electronic devices usually store many files in folders. Users can click or double click each folder to browse the files in the folder and/or a sub-folders arranged under the folder. However, the files and the sub-folders are displayed in a pop-up window. As the computer technology develops, customized display of folder representative icons is required.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
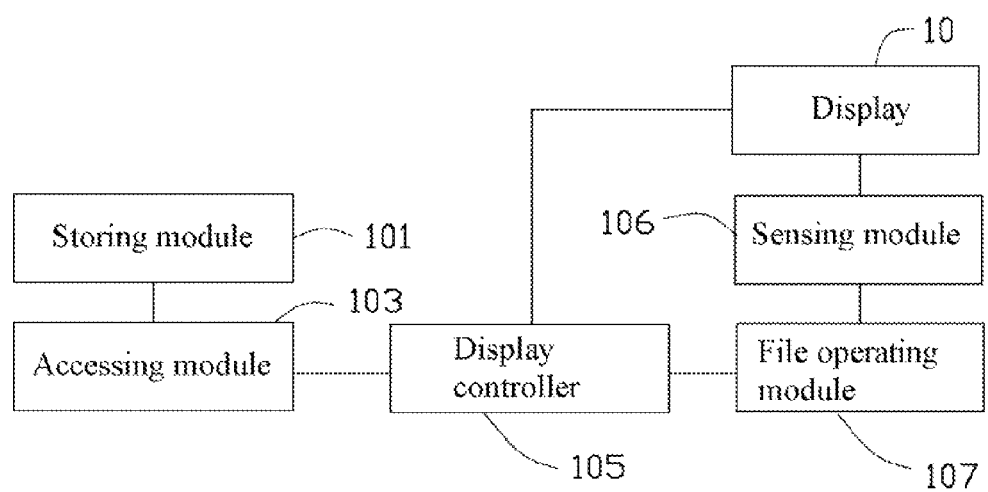
FIG. 1 is a schematic view of an electronic device in accordance with one embodiment.
Figure 2:
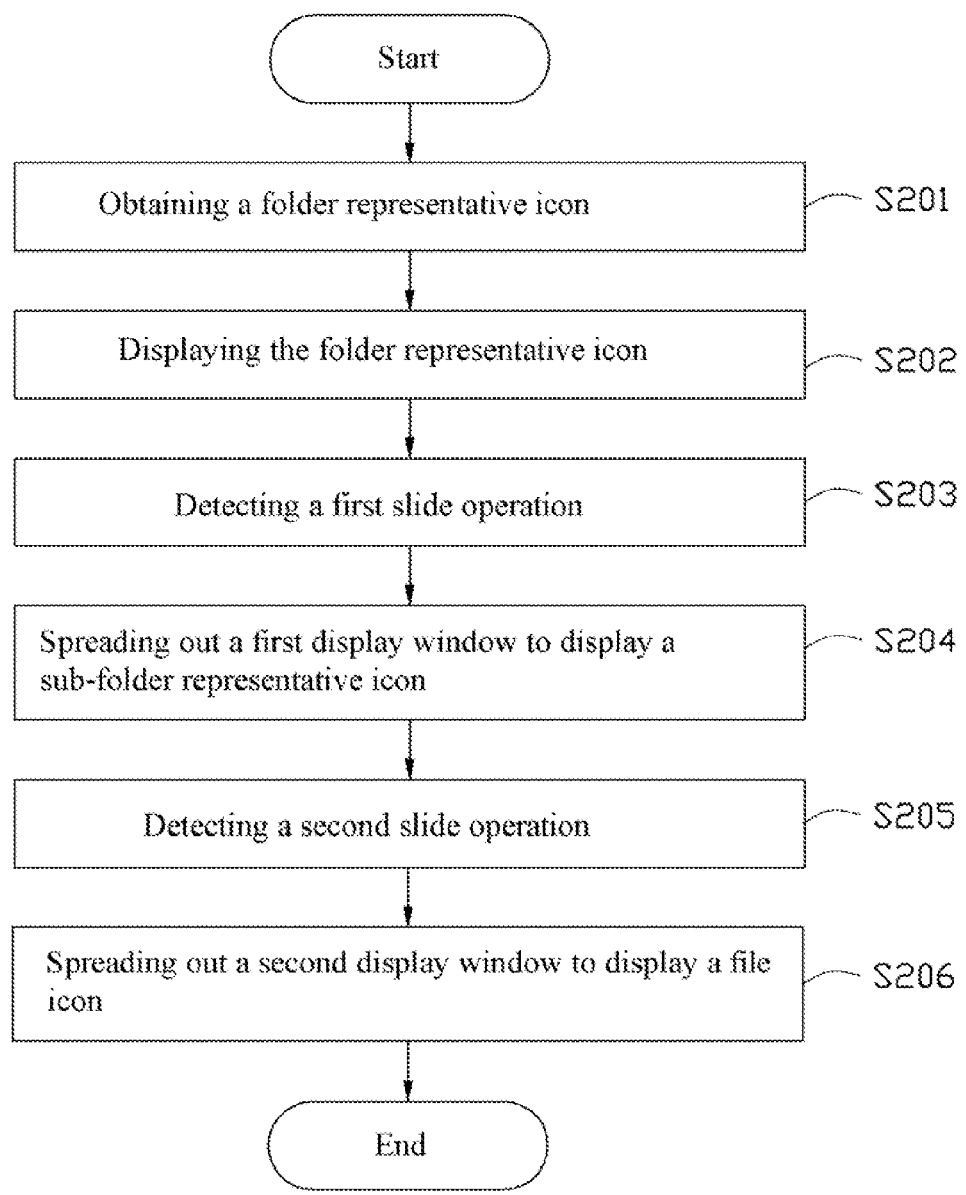
FIG. 2 is a flow chart of a file presenting method in accordance with one embodiment.
Figure 3:
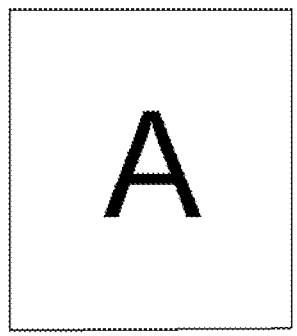
FIG. 3 is a schematic view of a folder representative icon of the electronic device of FIG. 1.
Figure 4:
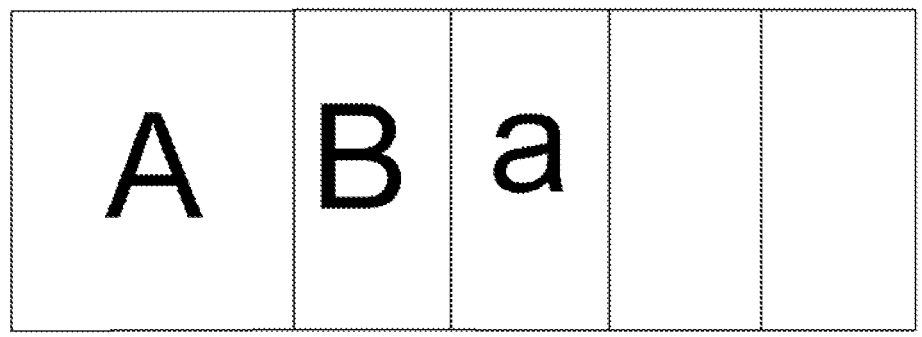
FIG. 4 is a schematic view of the folder representative icon of FIG. 3, the folder representative icon being operated.
Figure 5:
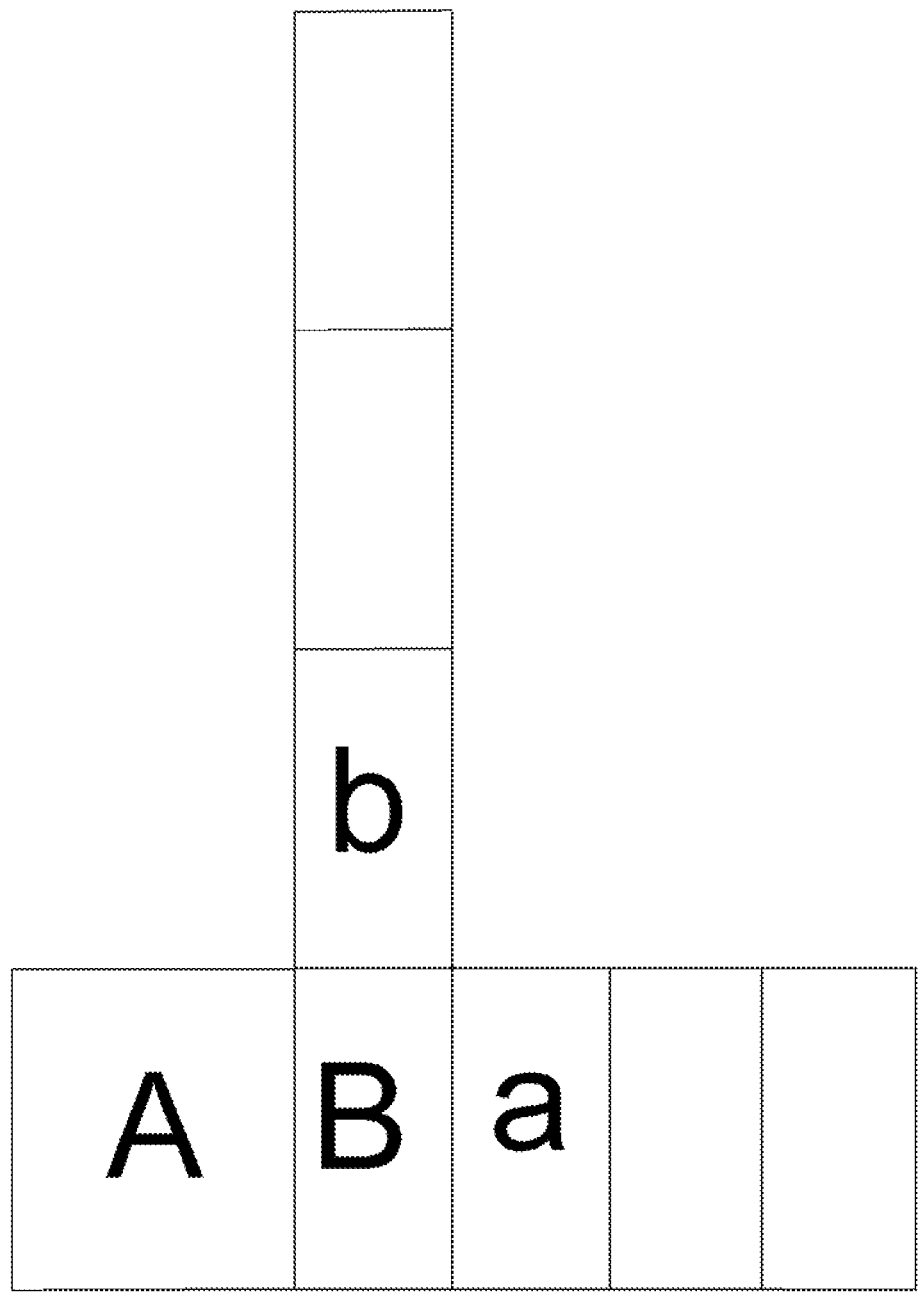
FIG. 5 is a schematic view of the folder representative icon of FIG. 3, the sub-folder representative icon being operated.
Figure 6:
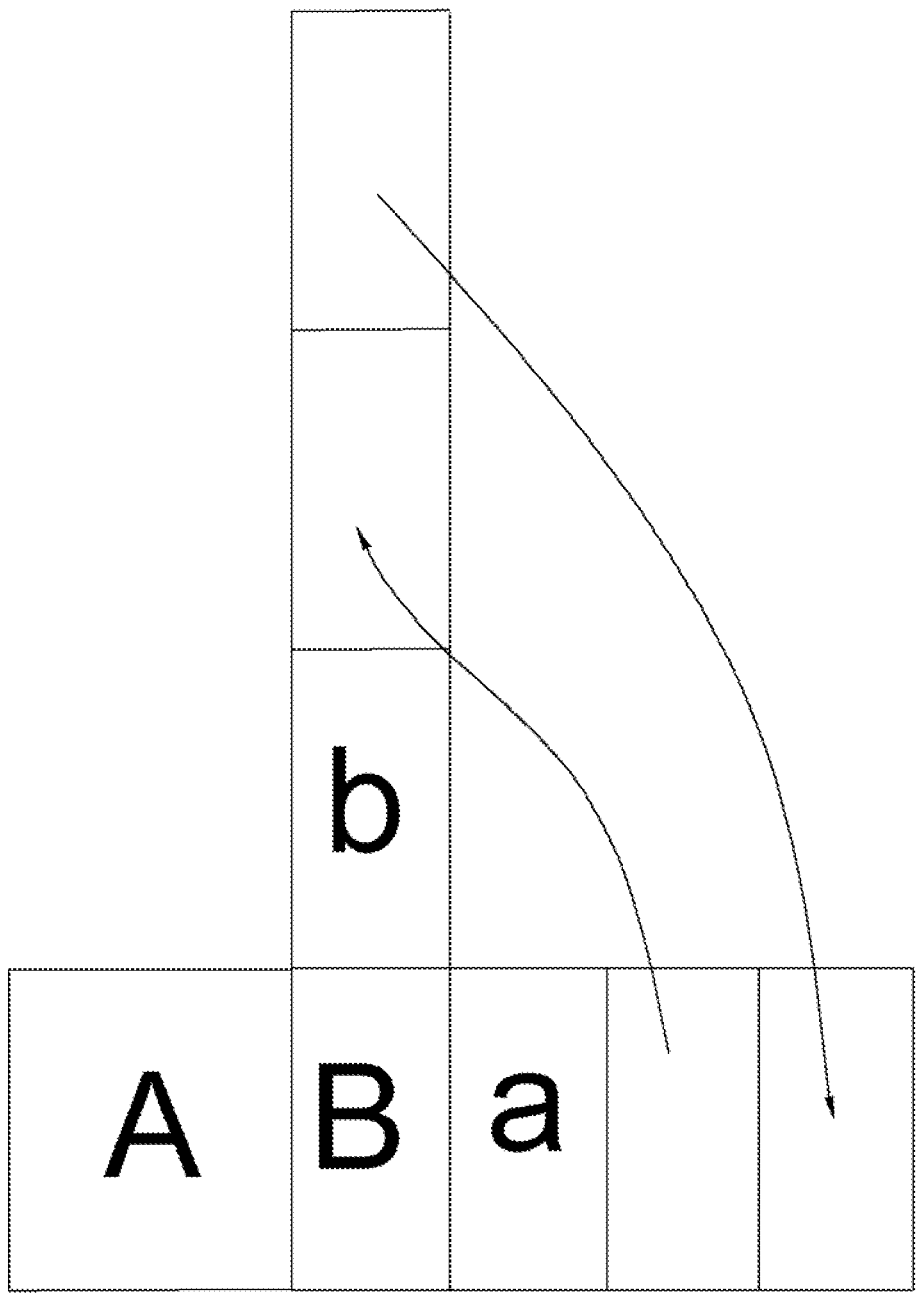
FIG. 6 is another schematic view of the folder representative icon of FIG. 3, the sub-folder representative icon being operated.

Referring to FIG. 1, an electronic device includes a display 10, a storing module 101, an accessing module 103, a display controller 105, a sensing module 106, and a file operating module 107. In one embodiment, the display 10 may be a touch-sensitive display.

The storing module 101 stores a plurality of folders and files. Each folder or file may be displayed as a representative icon on the display 10 and is arranged along a straight line. Some folders may include sub-folders. The files may include image files, video files, and audio files.

The accessing module 103 obtains the representative icons.

The display controller 105 arranges the representative icons to be displayed on the display 10 as path of the folders and files stored in the system.

The sensing module 106 detects a slide operation (also known as a "swipe") on the display 10 by a finger or stylus on an representative icon.

The file operating module 107 spreads out a corresponding display window gradually along the sliding direction from a side of the folder representative icon until the display window is entirely spread out on the display 10. The file operating module 107 also draws back the display window. The file operating module 107 further moves, delete or add folder representative icons.

Referring to FIGS. 2 to 6, a file presenting method is shown below.

In step S201, the accessing module 103 obtains a folder representative icon from the storing module 101.

In step S202, the display controller 105 displays the folder representative icon on the display 10, the folder representative icon is reel-shaped.

In step S203, The sensing module 106 detects a first slide operation on the display 10 along a first direction by fingers or stylus on the folder representative icon.

In step S204, the file operating module 107 spreads out a first display window gradually along the first direction from a side of the folder representative icon until the display window is entirely spread out on the display 10 to display a sub-folder representative icon and a file representative icon according to the first slide operation. At this time, the sub-folder representative icon and the file representative icon are shown in the first display window. In one embodiment, the folder representative icon is named "A", the sub-folder representative icon is named "B" and the file representative icon is named "a" (shown in FIG. 4).

In step S205, the sensing module 106 detects a second slide operation on the display 10 by fingers or stylus on the sub-folder representative icon.

In step S206, the file operating module 107 spreads out a second display window gradually, along a second direction substantially perpendicular to the first direction, from a side of the sub-folder representative icon. The second display window is then entirely spread out on the display 10 to display another file representative icon according to the second slide operation. In one embodiment, the another representative icon is named "b" (shown in FIG. 5).

The file operating module 107 draws back the second display window along a third direction opposite to the second direction when a third slide operation, along a direction opposite to the second slide direction is detected. The file operating module 107 draws back the first display window along a fourth direction, opposite to the first direction, when a fourth slide operation, along a direction opposite to the first slide direction, is detected. The file operating module 107 is further used for exchanging icons between the first display window and the second display window.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An electronic device comprising:
    a touch-sensitive display;
    a storing module, the storing module is configured to store a folder and a sub-folder, and a first file; the folder being displayed as a folder representative icon on the touch-sensitive display, the sub-folder being displayed as a sub-folder representative icon in a first display window on the touch-sensitive display, and the first file being displayed as a first file representative icon in a second display window on the touch-sensitive display;
    an accessing module, the accessing module is configured to obtain the folder representative icon from the storage module;
    a display controller, the display controller is configured to display the folder representative icon on the touch-sensitive display;
    a sensing module, the sensing module is configured to detect a first slide operation along a first direction on the touch-sensitive display on the folder representative icon; and
    a file operating module, the file operating module is configured to spread out the first display window from a first side edge of the folder representative icon along the first direction to display the sub-folder representative icon when the first slide operation is detected;
    wherein the sensing module is further configured to detect a second slide operation on the touch-sensitive display on the sub-folder representative icon after the first display window is spread out; and the file operating module is further configured to spread out the second display window from a second side edge of the sub-folder representative icon, along a second direction substantially perpendicular to the first direction, to display the first file representative icons when the second slide operation is detected; and the first side edge is connected to and substantially perpendicular to the second side edge.

2. The electronic device of claim 1, wherein the file operating module is further configured to draw back the second display window when a third slide operation, along a third direction opposite to the second direction on the second display window, is detected.

3. The electronic device of claim 1, wherein the file operating module is further configured to draw back the first display window when a third slide operation, along a third direction opposite to the first direction on the first display window, is detected.

4. The electronic device of claim 1, wherein the storing module is further configured to store a second file, the second file being displayed as a second file representative icon in the first display window on the touch-sensitive display, the second file representative icon and the sub-folder representative icon are displayed on the touch-sensitive display after the first display window is spread out.

5. The electronic device of claim 4, wherein the second file representative icon and the sub-folder representative icon are arranged in a straight line in the first display window; and the sub-folder representative icon is located at a cross portion where the first display window and the second display window meet and cross each other.

6. The electronic device of claim 1, wherein the file operating module is further configured to exchange representative icons between the first display window and the second display window.

7. A file presenting method comprising:
    obtaining a folder representative icon;
    displaying the folder representative icon on a touch sensitive display;
    detecting a slide operation on the folder representative icon substantially along a first direction;
    spreading out a first display window on the touch sensitive display along the first direction from a first side edge of the folder representative icon to display a sub-folder representative icon on the touch sensitive display;
    detecting a second slide operation substantially along a second direction on the sub-folder representative icon; wherein the second direction is substantially perpendicular to the first direction; and
    spreading out a second display window on the touch sensitive display, along the second direction, from a second side edge of the sub-folder representative icon to display a first file representative icon in the second display window touch sensitive display; wherein the first side edge is connected to and substantially perpendicular to the second side edge.

8. The file presenting method of claim 7, further comprising drawing back the second display window when a third slide operation, along a third direction opposite to the second direction, on the second display window is detected.

9. The file presenting method of claim 7, further comprising drawing back the first display window when a third slide operation, along a third direction opposite to the first direction, on the first display window is detected.

10. The file presenting method of claim 7, further comprising displaying a second file representative icon in the first display window; wherein the sub-folder representative icon is located at a cross portion where the first display window and the second display window meet and cross each other.

11. The file presenting method of claim 7, further comprising exchanging representative icons between the first display window and the second display window.

12. A file presenting method, comprising:
    providing an electronic device, the electronic device comprising a touch-sensitive display, a storing module, an accessing module, a display controller, a sensing module, and a file operating module;
    obtaining a folder representative icon from the storing module via the accessing module;
    displaying the folder representative icon on the touch-sensitive display via the display controller;
    detecting a first slide operation on the folder representative icon substantially along a first direction via the sensing module;
    spreading out a first display window on the touch-sensitive display from a first side edge of the folder representative icon via the file operating module along the first direction to display a sub-folder representative icon on the touch-sensitive display;
detecting a second slide operation on the sub-folder representative icon via the sensing module; and
spreading out a second display window on the touch-sensitive display from a second side edge of the sub-folder representative icon via the file operating module, substantially along a second direction to display a first file representative icon touch sensitive display, wherein the second direction is substantially perpendicular to the first direction; and the first side edge is connected to and substantially perpendicular to the second side edge.

13. The file presenting method of claim 12, further comprising drawing back the second display window via the file operating module when a third slide operation, along a third direction opposite to the second direction on the touch-sensitive display, is detected.

14. The file presenting method of claim 12, further comprising drawing back the first display window via the file operating module when a third slide operation, along a third direction opposite to the first direction, on the touch-sensitive display, is detected.

15. The file presenting method of claim 12, further comprising displaying a file representative icon in the first display window via the display controller; wherein the sub-folder representative icon is located at a cross portion where the first display window and the second display window meet and cross each other.

16. The file presenting method of claim 12, further comprising exchanging representative icons via the file operating module between the first display window and the second display window.

* * * * *